(12) United States Patent
Stündl et al.

(10) Patent No.: US 11,697,891 B2
(45) Date of Patent: Jul. 11, 2023

(54) MELT SPINNING DEVICE

(71) Applicant: Oerlikon Textile GmbH & Co. KG, Remscheid (DE)

(72) Inventors: Mathias Stündl, Wedel (DE); Stefan Kalies, Hoffeld (DE); Christian Hubert, Neumunster (DE); Jan Westphal, Schulp (DE); Eike Hoile, Hamburg (DE)

(73) Assignee: Oedikon Textile GmbH & Co. KG, Remscheid (DE)

( * ) Notice: Subject to any disclaimer, the term of this patent is extended or adjusted under 35 U.S.C. 154(b) by 162 days.

(21) Appl. No.: 16/764,156

(22) PCT Filed: Nov. 6, 2018

(86) PCT No.: PCT/EP2018/080275
§ 371 (c)(1),
(2) Date: May 14, 2020

(87) PCT Pub. No.: WO2019/096625
PCT Pub. Date: May 23, 2019

(65) Prior Publication Data
US 2020/0340141 A1    Oct. 29, 2020

(30) Foreign Application Priority Data

Nov. 17, 2017    (DE) .................... 10 2017 010 684.3

(51) Int. Cl.
*D01D 5/08*        (2006.01)
*D01D 7/00*        (2006.01)
(Continued)

(52) U.S. Cl.
CPC ................ *D01D 5/08* (2013.01); *B25J 5/02* (2013.01); *B25J 9/0018* (2013.01); *B25J 9/06* (2013.01);
(Continued)

(58) Field of Classification Search
None
See application file for complete search history.

(56) References Cited

U.S. PATENT DOCUMENTS

| | | | | |
|---|---|---|---|---|
| 3,802,318 A | * | 4/1974 | Sibbald | B65B 57/00 91/363 R |
| 4,604,787 A | * | 8/1986 | Silvers, Jr. | B23Q 3/15553 483/55 |
| RE32,854 E | * | 2/1989 | McCormick | B23Q 1/0009 279/4.06 |
| 5,657,710 A | * | 8/1997 | Foster | D05B 41/00 112/475.05 |

(Continued)

FOREIGN PATENT DOCUMENTS

| | | |
|---|---|---|
| CN | 101016656 | 8/2007 |
| EP | 1300496 | 4/2003 |

OTHER PUBLICATIONS

Machine Translation of EP1300496A1 via Google Patents, 8 pages. (Year: 2021).*

*Primary Examiner* — Emmanuel S Luk
(74) *Attorney, Agent, or Firm* — BainwoodHuang

(57) ABSTRACT

A melt spinning device for producing synthetic threads includes at least a spinneret apparatus, a cooling apparatus, a processing apparatus and a winding apparatus. An automatic operating device is provided for carrying out at least one operator action. The automatic operating device has at least one movable robotic arm, which can be coupled selectively to one of a plurality of exchangeable tools in order to selectively carry out a plurality of operator actions during a start-up and/or during a maintenance interval and/or during thread production. Thus, a high level of flexibility in the automated operation of the melt spinning device is ensured.

8 Claims, 6 Drawing Sheets

Figure 1:
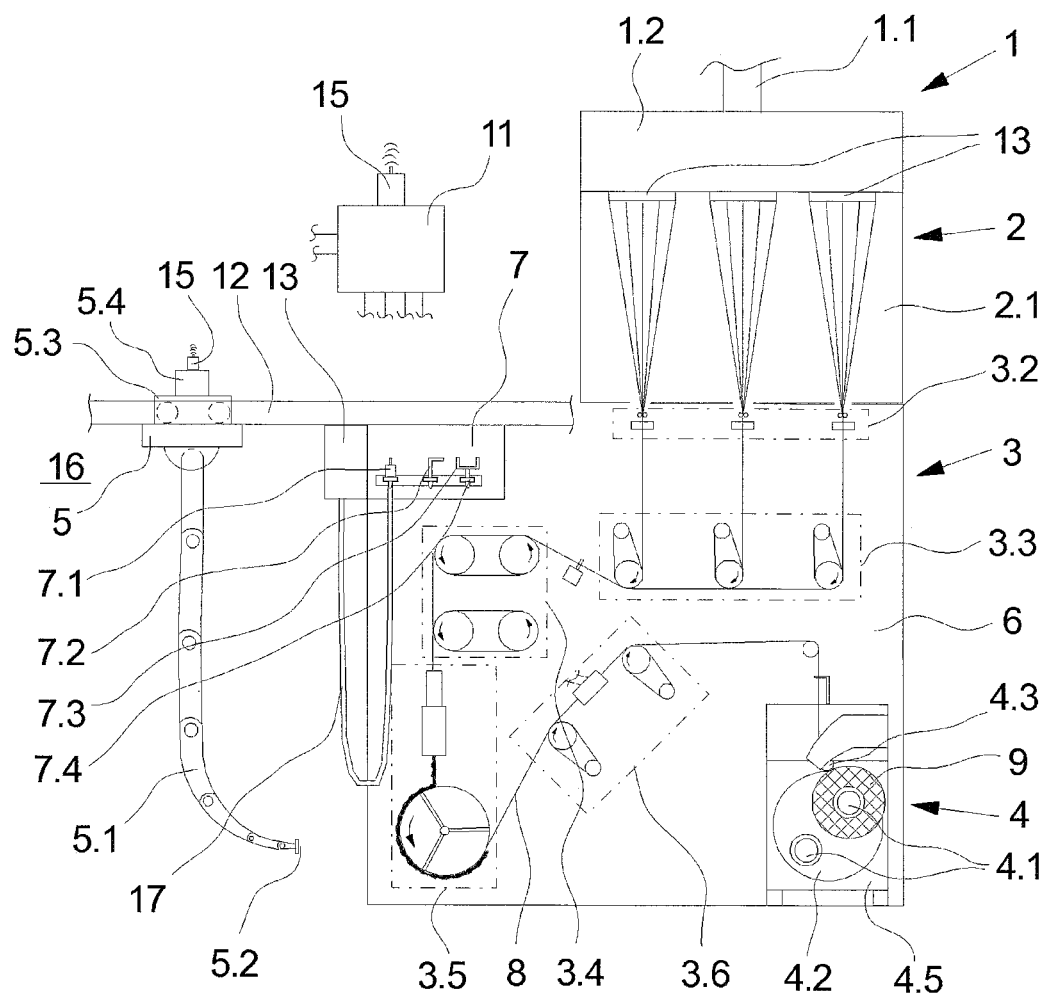

(51) Int. Cl.

| | |
|---|---|
| *D01D 13/02* | (2006.01) |
| *B29C 48/88* | (2019.01) |
| *B29C 48/05* | (2019.01) |
| *B29C 48/92* | (2019.01) |
| *B25J 5/02* | (2006.01) |
| *B25J 15/00* | (2006.01) |
| *B25J 15/04* | (2006.01) |
| *B25J 19/02* | (2006.01) |
| *B25J 13/06* | (2006.01) |
| *B25J 9/00* | (2006.01) |
| *B25J 9/06* | (2006.01) |

(52) U.S. Cl.
CPC ........... *B25J 13/06* (2013.01); *B25J 15/0019* (2013.01); *B25J 15/0066* (2013.01); *B25J 15/0491* (2013.01); *B25J 19/023* (2013.01); *B29C 48/05* (2019.02); *B29C 48/911* (2019.02); *B29C 48/92* (2019.02); *D01D 7/00* (2013.01); *D01D 13/02* (2013.01)

(56) References Cited

U.S. PATENT DOCUMENTS

| | | | |
|---|---|---|---|
| 6,136,132 A * | 10/2000 | Kinzie | B32B 38/10 156/258 |
| 6,332,861 B1 * | 12/2001 | Otsuka | B23Q 3/15706 483/13 |
| 2003/0099522 A1 * | 5/2003 | Laempe | B24B 27/04 409/224 |
| 2009/0049669 A1 | 2/2009 | Lennemann et al. | |
| 2009/0248041 A1 * | 10/2009 | Williams | A61B 8/445 606/130 |
| 2016/0059424 A1 * | 3/2016 | Zachary | B23B 31/1071 483/1 |
| 2016/0067840 A1 * | 3/2016 | Fujimoto | B25J 5/02 483/58 |
| 2016/0177540 A1 * | 6/2016 | Penza | E02F 3/96 37/347 |
| 2016/0346923 A1 * | 12/2016 | Kesil | B25J 9/1612 |
| 2017/0335271 A1 * | 11/2017 | Maggiore | B29C 64/106 |
| 2018/0065208 A1 * | 3/2018 | Mori | B25J 15/0491 |
| 2020/0061848 A1 * | 2/2020 | Bolton | B25J 15/0408 |

* cited by examiner

MELT SPINNING DEVICE

The invention relates to a melt-spinning device for producing synthetic threads as disclosed herein.

A melt-spinning device of the generic type for producing synthetic threads is known from EP 1 300 496 A1, for example.

The known melt-spinning device for producing a plurality of synthetic threads has a spinning nozzle installation, a cooling installation, a treatment installation, and a take-up winding installation, said installations being held in a machine frame so as to form a thread run. The spinning nozzle installation is disposed on an upper level above the treatment installation and the take-up winding installation. In order for a thread group that has been generated from the spinning nozzle installation to be threaded up on the sets of the treatment installation and of the take-up winding installations when a process is started, a robot which is moved vertically and horizontally by a guiding installation is provided. An additional doffer, which for changing the packages in the take-up winding installation is likewise embodied so as to be vertically and horizontally movable, is provided. To this extent, it is necessary in the case of the known melt-spinning device that the motions of the robot and of the doffer have to be mutually adapted in order for specific operator activities to be carried out. In particular in the case of process interruptions in which changing a package and fresh threading-up is necessary, there is the risk of collisions between the robot and the doffer. Moreover, several activities carried out by the operator, such as quality checks, for example, cannot be carried out in an automated manner so that additional safety measures are necessary in order for collisions between the operator and the robot or the doffer to be avoided.

It is now an object of the invention to improve a melt-spinning device of the generic type with a view to the upcoming operator activities of the treatment installation and of the take-up winding installation being able to be carried out in a rapid and targeted manner.

A further objective of the invention lies in providing a melt-spinning device of the generic type in which the tasks to be carried out by an operator are reduced to a minimum.

This object is achieved according to the invention in that the robotic operator has at least one movable robotic arm which for selectively carrying out a plurality of operator activities during commissioning and/or during a maintenance interval and/or during the production of thread is selectively couplable to one of a plurality of interchangeable tools.

Advantageous refinements of the invention are defined by the features and combinations of features as disclosed herein.

The invention has the particular advantage that at least the operator activities arising in the treatment installation and in the take-up winding installation are able to be carried out in an automated manner. For example, the threading-up of the threads in the treatment installation at the beginning of the process, and the retrieving of full packages in the take-up winding installation during the production of thread can thus be carried out by the robotic operator by way of the tool required in each case. The tools can thus be conceived with a view to the respective operator activity and be selectively guided by the robotic arm in order for the operator activity to be carried out.

In order for the tools required for carrying out the operator activities to be kept ready, the tools according to one advantageous refinement of the invention are disposed in a tool magazine, wherein the robotic arm for retrieving and for dispensing the tools interacts with the tool magazine. The tools can thus be releasably connected to the robotic arm by way of a coupling system, for example.

In order for a plurality of treatment installations and take-up winding installations which are usually disposed beside one another in numbers in a machine plant to be able to be served, the refinement of the invention in which the tool magazine is disposed on the robotic operator is preferably embodied. The robotic arm can thus directly dispose of each of the tools in each spinning position.

In principle, it is however also possible for the magazine to be disposed in a holding station where the robotic operator is parked.

In order for the threads to be guided and be threaded up when starting a process or interrupting a process, one of the tools is a suction injector installation by way of which one or a plurality of threads is/are guidable to a waste container. The suction injector installation which can be acquired and guided by the robotic arm herein can be coupled to the waste container by way of a fixed connector or by way of a releasable plug connector.

The refinement of the invention in which one of the tools is a gripping installation by way of which one or a plurality of packages and/or one or a plurality of package tubes is/are guidable is particularly advantageous, in particular for retrieving full packages and for stocking empty tubes in the take-up winding installation.

In order for regular quality checks to be able to be carried out in an automated manner in the production of the threads, one of the tools is a measuring installation by way of which one or a plurality of product parameters is/are measurable. The thread tension in the thread run of the threads can thus preferably be monitored by a measuring installation of this type which is guided by the robotic arm.

In particular for diagnosing process interruptions or for evaluating traces of wear on the process sets, it is furthermore provided that one of the tools is a camera installation by way of which one or a plurality of thread runs in the installations is/are monitorable. Preventive maintenance jobs can thus also be carried out in a targeted manner.

In order for an operator aisle which could be used for transporting the full packages to be kept free, the robotic operator according to one advantageous refinement of the invention is configured so as to autonomously travel on a suspended track which extends along a plurality of treatment installations and take-up winding installations. The deployment of the robotic operator can thus be extended to a plurality of treatment installations and take-up winding installations. Moreover, any collision of the robotic arm with people or installations in the operator aisle is to be avoided.

For communication and for data transfer the robotic operator has a robot control apparatus which is connected to a machine control unit. The control programs of the robotic operator required in each case can thus be triggered in a simple manner by way of a control command of the machine control unit.

The linking between the machine control unit and the robot control apparatus preferably takes place by way of a wireless connection such that a flexible deployment at a plurality of positions of the robotic operator is possible.

The operator activities to be carried out by the robotic operator can be carried out during commissioning or during maintenance or during the production of thread, independently of the respective operating situation. To this extent, the method according to the invention for operating a melt-spinning device is particularly advantageous in order for a multiplicity of operator activities to be able to be carried out in an automated manner in the melt-spinning device. On account of the relatively high mobility of the robotic arm and of the adaptation of various tools, the scope of the operator activities to be assumed by the robotic operator is unlimited. To this extent, a high degree of automation can be implemented independently of whether only one synthetic thread or a plurality of synthetic threads is/are being produced.

Depending on the scope of the operator activities, there is also the fundamental possibility for the robotic operator to have a plurality of robotic arms for receiving changing tools. There is also the possibility herein that the tools in terms of the conception thereof are conceived for not only one of the operator activities but can assume a plurality of operator activities. For example, a suction injector installation can thus be embodied in such a manner that said suction injector installation would also be suitable for receiving full packages.

In the case of a plurality of operator activities having to be carried out simultaneously by the robotic operator, a task sequence is preferably established as a function of ideally short idle times by the machine control installation and the robot control apparatus.

The melt-spinning device according to the invention for producing synthetic threads will be explained in more detail hereunder by means of a few exemplary embodiments with reference to the appended figures.

Figure 2:
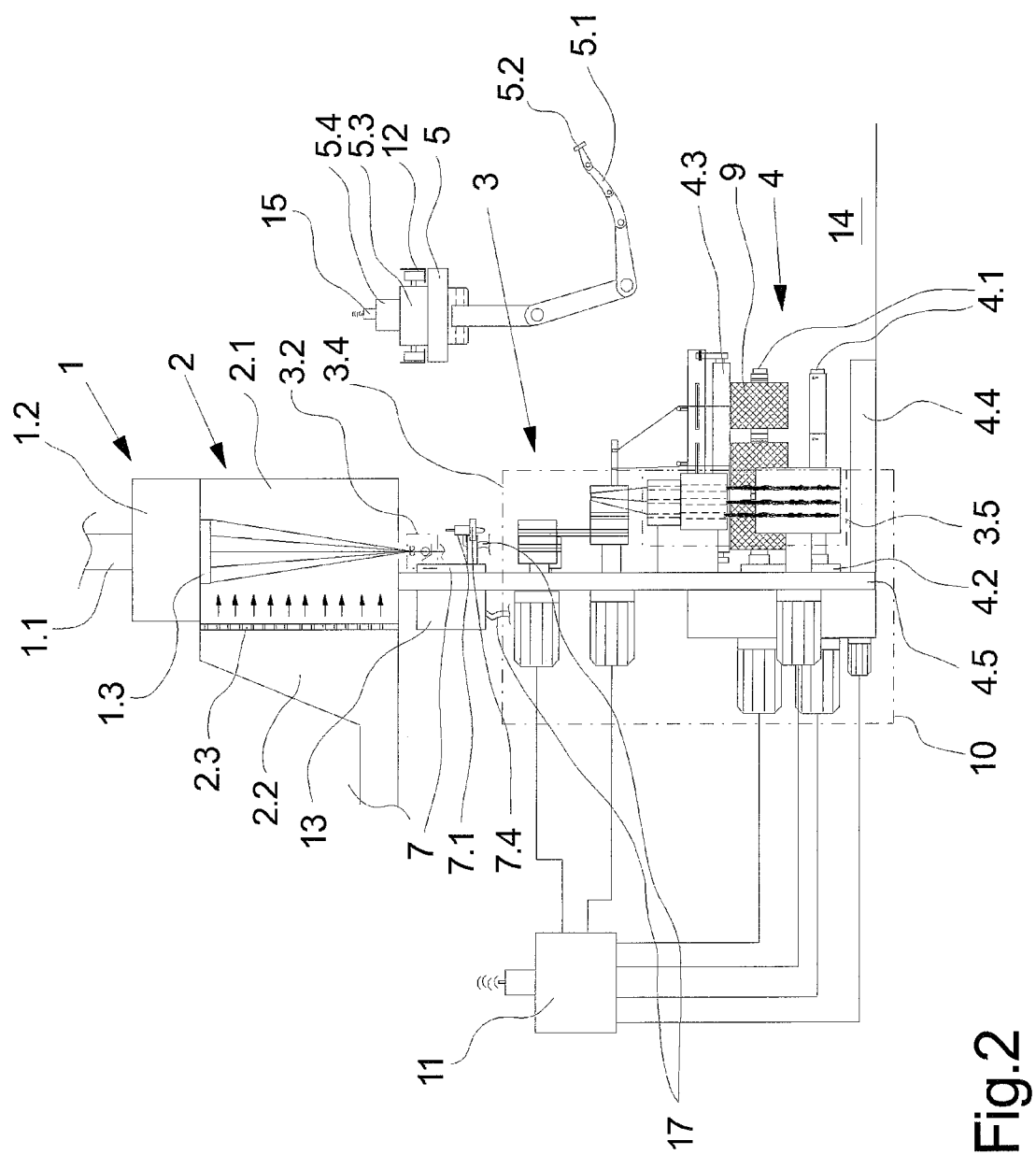

In the figures:

FIG. 1 schematically shows a frontal view of an exemplary embodiment of the melt-spinning device according to the invention FIG. 2 schematically shows a lateral view of the exemplary embodiment of the melt-spinning device according to the invention from FIG. 1

Figure 3:
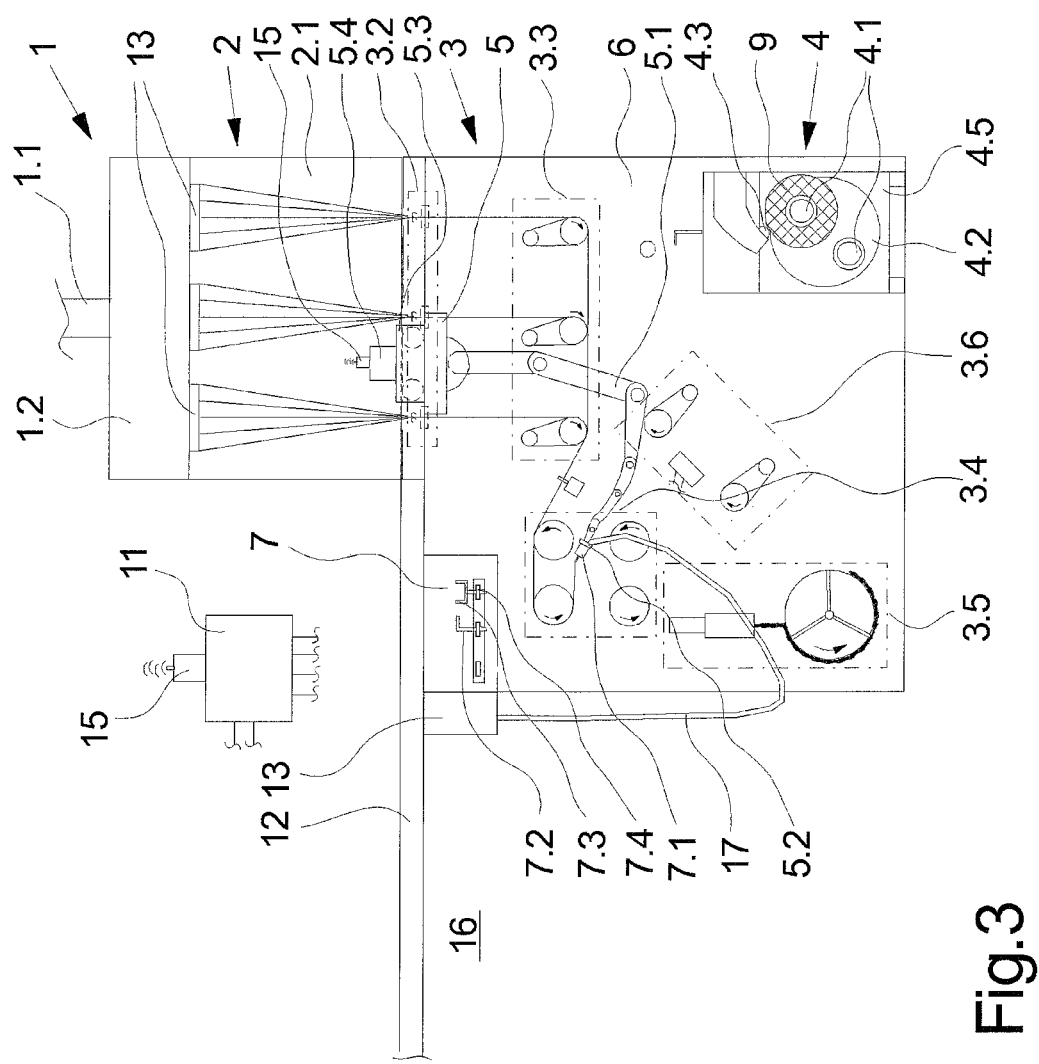
Figure 4:
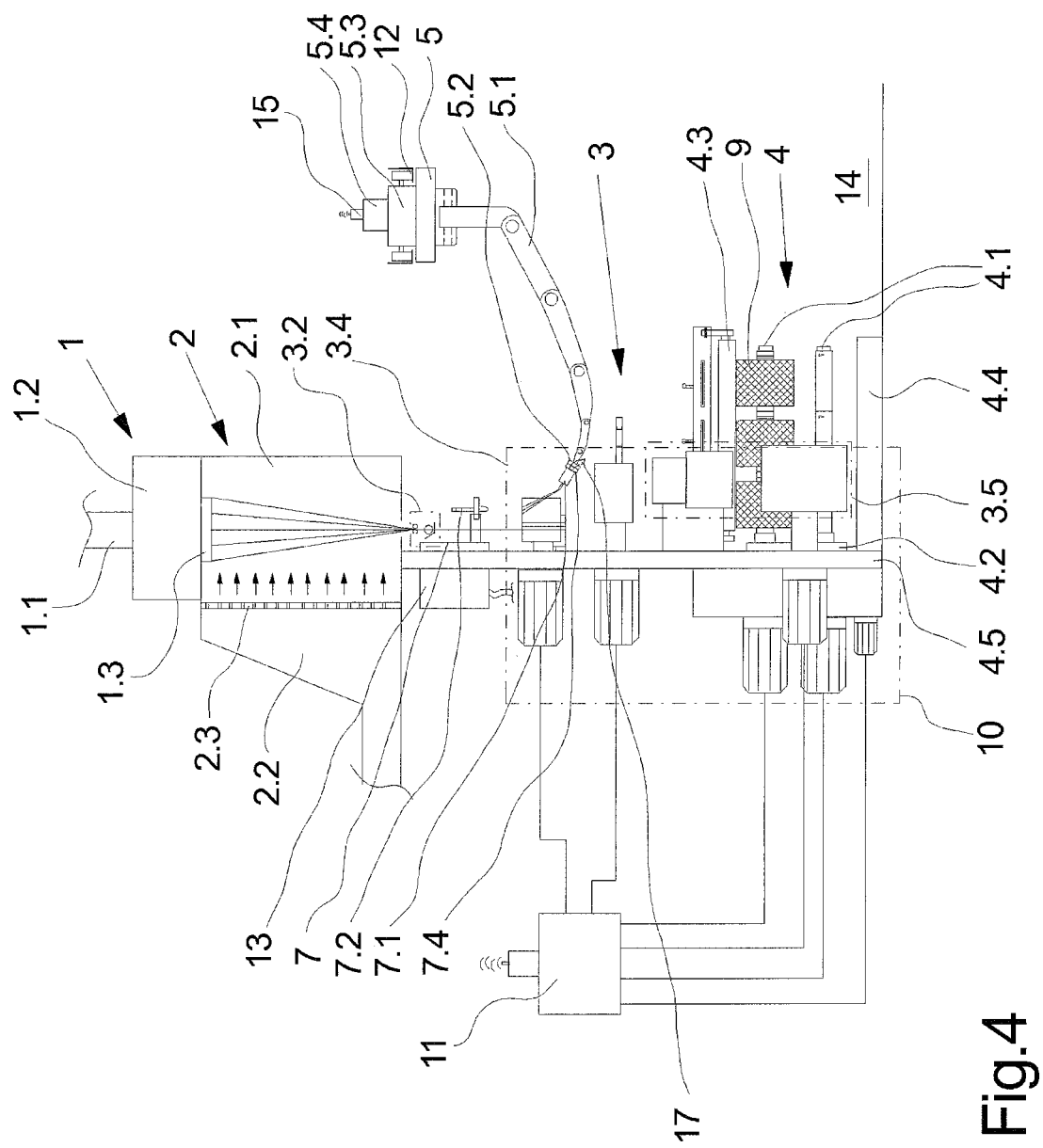
Figure 5:
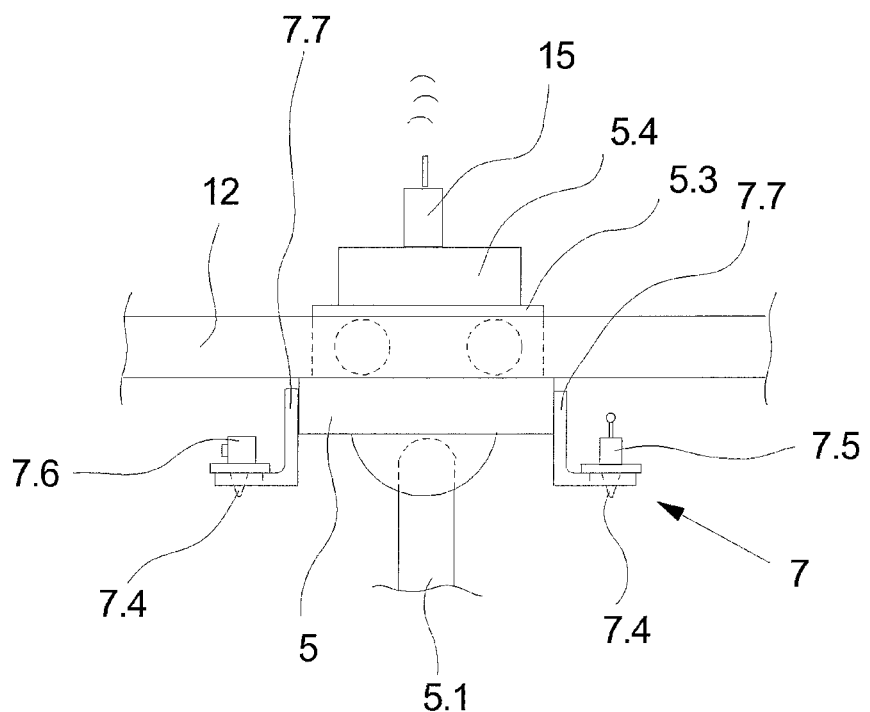
Figure 6:
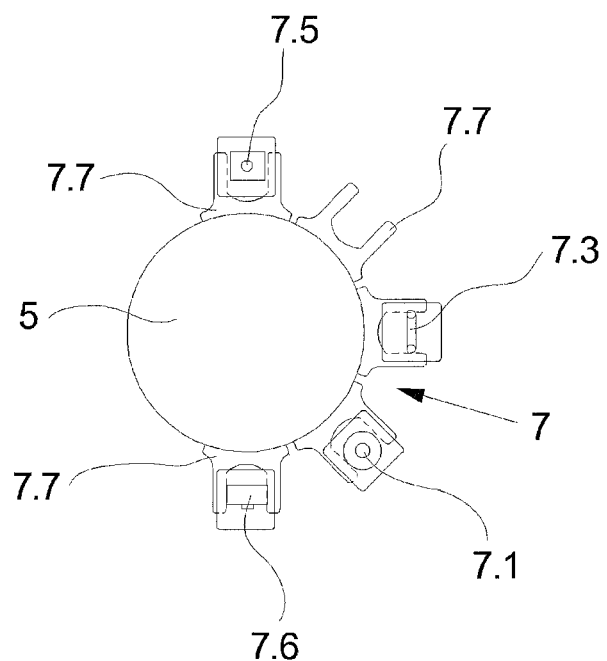

FIG. 3 schematically shows the exemplary embodiment from FIG. 1 when starting a process FIG. 4 schematically shows the exemplary embodiment from FIG. 2 when starting a process FIG. 5 schematically shows a view of a further exemplary embodiment of a robotic operator FIG. 6 schematically shows a plan view of the exemplary embodiment from FIG. 5

A first exemplary embodiment of the melt-spinning device according to the invention for producing synthetic threads is illustrated in a plurality of views in FIGS. 1 and 2. FIG. 1 shows the exemplary embodiment in a frontal view, and a lateral view is schematically shown in FIG. 2. To the extent that no explicit reference is made to any of the figures, the description hereunder applies to both figures.

The exemplary embodiment according to FIGS. 1 and 2 has a spinning nozzle installation 1 having a total of three spinning nozzles 1.3 which are disposed beside one another. The number of spinning nozzles in the spinning nozzle installation 1 is exemplary and may also comprise substantially more than three threads per spinning position. The spinning nozzles 1.3 are held on a lower side of a heated spinning beam 1.2. The spinning beam 1.2 contains further melt-conducting parts which are not illustrated so as to feed the thermoplastic melt fed from a melt source by way of a melt infeed 1.1 to the spinning nozzles 1.3. To this extent, at least one or a plurality of spinning pumps as well as manifold lines are disposed in the spinning beam 1.2. The spinning nozzles 1.3 on the lower sides thereof have a multiplicity of nozzle openings from which a multiplicity of strand-shaped filaments are in each case extruded.

A cooling installation 2 which by way of a cooling duct 2.1 extends directly below the spinning nozzles 1.3 is disposed below the spinning nozzle installation 1. The cooling installation 2 in this exemplary embodiment is embodied as a cross-flow blower in which a cooling air stream is generated by means of a laterally disposed blower chamber 2.2 and by way of a blower wall 2.3 is directed onto the filament strands of the threads.

The spinning nozzle installation 1 and the cooling installation 2 are disposed on an upper level. The treatment installation 3 and the take-up winding installation 4 are disposed below the cooling installation 2 on a lower level. An assembly wall 6 serves for receiving the treatment installation 3. The assembly wall 6 has a spin-finish device 3.2 which is directly below the cooling installation 2 and which has one assembly thread guide and one wetting means for each thread. The spin-finish device 3.2 on the assembly wall is followed by a drawing-off device 3.3, a drafting device 3.4, a crimping device 3.5, and an entangling device 3.6. The thread-conducting and thread-treating components of the drawing-off device 3.3, of the drafting device 3.4, of the crimping device 3.5, and of the entangling device 3.6 are held on a front side of the assembly wall 6. A drive installation 10 having a plurality of drives is provided on the rear side of the assembly wall 6 and is assigned to the devices 3.3, 3.4, 3.5, and 3.6.

Since a treatment installation 3 of this type is well known and derived from EP 2 567 008 B1, any further description hereunder is dispensed with and reference made to the cited publication.

The take-up winding installation 4 assigned to the treatment installation 3 in this exemplary embodiment is configured so as to have a rotatably mounted winding turret 4.2 in a machine frame 4.5. Two winding spindles 4.1 are disposed so as to be rotatably mounted and mutually spaced apart on the winding turret 4.2. The take-up winding installation 4 in this exemplary embodiment has three winding stations such that three packages 9 can in each case be wound simultaneously on the winding spindles 4.1. The winding spindles 4.1 in a winding region interact with a contact pressure roller 4.3 and a traversing device 4.4.

The machine frame 4.5 is integrated in the assembly wall 6 and on the rear side is combined with the drive installation 10. The winding spindles 4.1 and the winding turret 4.2 as well as the traversing device 4.4 are thus driven by separate drives.

The drive installation 10 is linked to a machine control unit 11.

A robotic operator 5 is disposed so as to be laterally beside the treatment installation 3. The robotic operator 5 has a long-protruding robotic arm 5.1. The robotic arm 5.1 is embodied with multiple axes and on a free end has a tool adapter 5.2. The robotic operator 5 by way of an autonomous travelling device 5.3 is guided on a suspended track 12. The suspended track 12 extends above the treatment installation 3 and a doffing aisle 14 which on the machine longitudinal side extends in front of the end side of the take-up winding installation 4. The robotic operator 5 contains a robot control apparatus 5.4 so as to be able to carry out the control programs stored for guiding the robotic arm 5.1. The robot control apparatus 5.4 is linked to the machine control unit 11 by a wireless connection 15.

A tool magazine 7 is disposed in the upper region on the assembly wall 6. The tool magazine 7 has a holding installation 7.7 for receiving a plurality of tools. A suction injector installation 7.1, a gripping installation 7.3, and a package remover 7.2 are illustrated in an exemplary manner as tools.

The suction injector installation 7.1 is connected to a waste container 13 by way of a waste line 17. A compressed air line not illustrated here connects the suction injector 3.1 to a compressed air source. The waste line 17 and the compressed air line are embodied so as to be flexible so that the suction injector 7.1 when acquired by the robotic arm 5.1 is guidable in a flexible manner. Each of the tools 7.1, 7.2, and 7.3 is assigned a coupling adapter 7.4 which is couplable selectively to the tool adapter 5.2 on the robotic arm 5.1. The tools 7.1, 7.2, and 7.3 can thus be separately retrieved from the tool magazine 7 by the robotic arm 5.1 and returned upon having carried out the operational activity assigned to the tool. Apart from the purely mechanical connection between one of the coupling adapters 7.4 and the tool adapter 5.2 on the robotic arm 5.1, electrical plug connections for transmitting signals can also be coupled herein. The suction injector installation 7.1 can thus be activated and deactivated by way of the robot control apparatus 5.4, for example.

The exemplary embodiment of the melt-spinning device according to the invention in FIGS. 1 and 2 is illustrated in a normal operating situation in which a total of three synthetic threads are being produced. To this end, a polymer melt is fed to the spinning nozzle installation 1 which by means of the spinning nozzles 1.3 extrudes in each case a multiplicity of filaments from the polymer melt. The filaments are cooled by the cooling installation 2, wherein the thread 8 by means of the drawing-off device 3.3 are in each case individually drawn-off from the spinning nozzle installation 1. After the cooling, the filament bundles are gathered by the spin-finish device 3.2 and in each case the thread 8 and subsequently fed collectively to the drafting device 3.4. After the drafting, the threads are crimped in the crimping device 3.5 and entangled by the entangling device 3.6 prior to being wound to form a package.

As is derived from the illustration in FIGS. 1 and 2, the robotic operator 5 is parked in a holding station 16 where the robotic arm 5.1 has direct access to the tool magazine 7. The robotic operator 5 in the holding station 16 awaits control commands of the machine control unit 11 so as to herein be able to carry out an upcoming operator activity. The packages 9 which have been completely wound thus have to be doffed in the take-up winding installation 4 during the production of thread and be transferred to a transport system, for example. The packages 9 doffed from a winding spindle 4.1 then have to be replaced with empty tubes. In order for these operator activities to be able to be carried out, the robotic arm 5.1 will first retrieve the package remover 7.2 from the tool magazine 7. The robotic operator 5 is repositioned from the holding station 16 to the take-up winding installation 4 by the autonomous travelling device 5.3. The robotic arm 5.1 is then controlled in a manner corresponding to a predefined control program so as to by way of the package remover 7.2 transfer the packages 9 from the winding spindle 4.1 to a transport system not illustrated here. As soon as the packages have been cleared away from the winding spindle 4.1, the tool on the robotic arm 5.1 is exchanged and the robotic arm 5.1 is equipped with the gripping installation 7.3. A winding tube can be retrieved from a tube magazine not illustrated in more detail here and plug-fitted onto the winding spindle 4.1 by means of the gripping installation 7.3. This procedure is repeated in order to place the required number of winding tubes on the winding spindle 4.1.

The robotic operator 5 can thus be utilized for carrying out a plurality of operator activities in each operating situation. Operator activities can thus also be carried out by the robotic operators during commissioning or during a maintenance interval. The exemplary embodiment of the melt-spinning device in FIGS. 3 and 4 is illustrated during commissioning. In this situation the suction injector installation 7.1 is retrieved from the tool magazine 7 by the robotic arm 5.1 and utilized for guiding the threads. The threads which are extruded by the spinning nozzle installation 1 can thus be continuously received and guided to the waste container 13 by way of the suction injector 7.1. The situation in which the robotic arm 5.1 threads up the thread group in the drafting device 3.4 is shown in FIGS. 3 and 4. The robotic arm 5.1 herein is controlled in a manner corresponding to a control program so as to be able to carry out the threading-up.

The exemplary embodiment of the melt-spinning device illustrated in FIGS. 1 to 4 in terms of the embodiment of the robotic operator 5 and in terms of carrying out the operator activities is shown only in an exemplary manner. In principle, other tools not illustrated here can also be utilized in order to be able to carry out specific operator activities. The robotic operator 5 could thus check a thread tension in the process at regular intervals, for example. The values measured herein are directly transmitted to a database.

It is thus also possible for the robotic operator 5 with the aid of a camera system which is guided on the robotic arm 5.1 to take images of regions of details of the process, for example a thread run in the spin-finish device 3.2 or a thread run in the drafting device 3.4 or a thread-plug formation in the crimping device 3.5. Comparisons between actual values and nominal values can then be carried out in the machine control unit 11 so as to initiate any potential preventive maintenance jobs. The robotic operator 5 can moreover also be utilized for carrying out cleaning jobs during a maintenance interval. Remnants of threads and also dust can thus be received and discharged by way of the suction injector installation 7.1, for example. Thread remnants and fluff in particular in the region of the take-up winding installation 4 can have a negative influence on the wound thread quality in the package 9 so that a regular deployment of the robotic operator 5 for cleaning the take-up winding installation 4 is particularly advantageous.

In the exemplary embodiment illustrated in FIGS. 1 and 2 the robotic operator 5 is assigned to a treatment installation 3 and a take-up winding installation 4. In principle, there is the possibility for the robotic operator 5 to assume further operator activities in the region of the spinning nozzle installation 1. Moreover, the robotic operator 5 can also be advantageously deployed for a plurality of treatment installations 3 and take-up winding installations 4. It is thus commonplace for a plurality of melt-spinning devices to be used beside one another as so-called spinning positions of an entire plant for the production of threads. To this end, the suspended track 12 extends parallel to a machine longitudinal side at which the treatment installations 3 are set up beside one another. In order for the operator activities desired herein to be able to be carried out with high flexibility, the robotic operator 5 has an integrated tool magazine 7. To this end, an exemplary embodiment of a tool magazine 7 on the robotic operator 5 is illustrated in a plurality of views in FIGS. 5 and 6. FIG. 5 schematically shows a lateral view, and a plan view of the robotic operator 5 is illustrated in FIG. 6. The description hereunder thus applies to both figures.

A tool magazine 7 having a plurality of tool holders 7.7 beside one another is disposed on the robotic operator 5. One of a plurality of tools is held on each of the tool holders 7.7. The tool magazine 7 in this exemplary embodiment has a total of five different tools 7.1 to 7.6. Apart from a suction injector installation 7.1, a gripping installation 7.3, a package mandrel 7.2, a measuring installation 7.5, and a camera installation 7.6 are shown. Each of the tools 7.1 to 7.6 is assigned a coupling adapter 7.4 so as to be connected to the robotic arm 5.1 by way of a tool adapter 5.2. The robotic arm 5.1 by way of the corresponding tool can thus carry out the desired operator activity in any arbitrary position.

The robotic operator is guided on a suspended track in the exemplary embodiments according to FIG. 1 and FIG. 2. Alternatively, there is also the possibility for the robotic operator to move as an autonomously travelling floor-bound vehicle.

The invention claimed is:

1. Melt-spinning device for producing synthetic threads, having at least one spinning nozzle installation, having at least one cooling installation, having at least one treatment installation, having at least one take-up winding installation, and having at least one movable robotic operator for carrying out at least one operator activity,
   wherein the robotic operator has at least one movable robotic arm which for selectively carrying out a plurality of operator activities during commissioning and/or during a maintenance interval and/or during the production of thread is selectively couplable to one of a plurality of interchangeable tools,
   wherein the tools are kept ready in a tool magazine disposed on the robotic operator,
   wherein one of the tools is a suction injector installation by way of which one or a plurality of threads is/are guidable to a waste container, and
   wherein one of the tools is a gripping installation by way of which one or a plurality of packages and/or one or a plurality of package tubes is/are guidable.

2. Melt-spinning device according to claim 1, wherein the robotic arm for retrieving and for dispensing the tools interacts with the tool magazine.

3. Melt-spinning device according to claim 1, wherein one of the tools is a measuring installation by way of which one or a plurality of product parameters is/are measurable.

4. Melt-spinning device according to claim 1, wherein one of the tools is a camera installation by way of which one or a plurality of thread runs in the installations is/are monitorable.

5. Melt-spinning device according to claim 1, wherein the robotic operator is configured so as to autonomously travel on a suspended track which extends along a plurality of treatment installations and take-up winding installations.

6. Melt-spinning device according to claim 1, wherein the robotic operator for carrying out the operator activities has a robot control apparatus, and in that the robot control apparatus is connected to a machine control installation.

7. Melt-spinning device according to claim 6, wherein the robot control apparatus and the machine control installation are linked to one another by way of a wireless connection.

8. Method for operating a melt-spinning device for producing one or a plurality of synthetic threads which are extruded by means of a spinning nozzle installation, which are cooled by means of a cooling installation, which are treated by means of a treatment installation, and which are wound so as to form packages by means of a take-up winding installation,
   wherein at least one operator activity is carried out by a movable robotic operator,
   wherein the robotic operator by means of interchangeable tools selectively carries out a plurality of operator activities during commissioning and/or a maintenance interval and/or during the production of thread,
   wherein the tools are kept ready in a tool magazine disposed on the robotic operator,
   wherein one of the tools is a suction injector installation by way of which one or a plurality of threads is/are guidable to a waste container, and
   wherein one of the tools is a gripping installation by way of which one or a plurality of packages and/or one or a plurality of package tubes is/are guidable.

* * * * *